United States Patent
Ante et al.

(10) Patent No.: US 6,643,976 B2
(45) Date of Patent: Nov. 11, 2003

(54) PRESSURE SENSOR DEVICE

(75) Inventors: Johannes Ante, Regensburg (DE);
Christian Geiger, Moosham (DE);
Markus Gilch, Mauern (DE);
Hans-Peter Landgraf, Regensburg
(DE); Andreas Ott, Steinsberg (DE)

(73) Assignee: First Sensor Technology GmbH, Berlin (DE)

( * ) Notice: Subject to any disclaimer, the term of this patent is extended or adjusted under 35 U.S.C. 154(b) by 0 days.

(21) Appl. No.: 10/106,146

(22) Filed: Mar. 26, 2002

(65) Prior Publication Data

US 2002/0134164 A1 Sep. 26, 2002

(30) Foreign Application Priority Data

Mar. 26, 2001 (DE) .......................... 101 14 862

(51) Int. Cl.$^7$ ................................. G01L 7/08
(52) U.S. Cl. ..................... 43/715; 73/720; 73/721; 73/725; 73/726; 73/727
(58) Field of Search ................. 73/721, 715, 720, 73/708, 725, 727; 338/42

(56) References Cited

U.S. PATENT DOCUMENTS 6,131,466 A * 10/2000 Vigna et al. .............. 73/721

2002/0100330 A1 * 8/2002 Eickhoff et al. ............ 73/715

FOREIGN PATENT DOCUMENTS

| DE | 2 123 135 | 11/1971 |
|----|-----------|---------|
| DE | 42 31 326 A1 | 4/1993 |
| DE | 41 37 624 A1 | 5/1993 |
| DE | 197 14 703 A1 | 10/1997 |
| DE | 198 33 712 A1 | 1/1999 |

* cited by examiner

Primary Examiner—Andrew H. Hirshfeld
Assistant Examiner—Marissa Ferguson
(74) Attorney, Agent, or Firm—Laurence A. Greenberg; Werner H. Stemer; Ralph E. Locher

(57) ABSTRACT

A pressure sensor device is described that has a diaphragm acted upon by a working medium, on a first side, and a sensor chip, which is disposed on a second side of the diaphragm that is remote from the working medium. There is formed in the sensor chip a measuring bridge having four sensor elements, which form two pairs disposed parallel, and the pairs are disposed at right angles to one another. The sensor elements are disposed such that they are closely spaced apart from one another in the edge region of the sensor chip that faces toward the central point of the diaphragm.

3 Claims, 2 Drawing Sheets

PRESSURE SENSOR DEVICE

BACKGROUND OF THE INVENTION

Field of the Invention

The invention relates to a pressure sensor device that is suitable, in particular, for detecting high pressures. Pressure sensor devices of this type are used, in particular, for detecting fuel pressure in a fuel supply unit of a motor vehicle.

A known pressure sensor device (see Published, Non-Prosecuted German Patent Application DE 198 33 712 A1) has a diaphragm body with a cylindrical recess in which the working medium is situated. A diaphragm is formed in the diaphragm body in a manner adjoining the recess. On the diaphragm, a sensor chip is disposed concentrically with respect to the cylindrical recess. On the sensor chip, sensor elements are disposed centrosymmetrically with respect to the central point of the sensor chip and thus the axis of the cylindrical recess. The sensor elements are connected up in the form of a Wheatstone bridge and yield a sensor signal that represents the pressure in the working medium. A good measurement behavior of the sensor elements in the known pressure sensor device is ensured only when the sensor elements lie approximately in the region of the end face—projected on the sensor chip—of the cylindrical recess. The consequence of this, however, is that the sensor chip must in each case be adapted to the diameter of the cylindrical recess. In the case of relatively large diameters of the recess, this also inevitably necessitates a relatively large sensor chip, which increases the costs for the production thereof.

SUMMARY OF THE INVENTION

It is accordingly an object of the invention to provide a pressure sensor device which overcomes the above-mentioned disadvantages of the prior art devices of this general type, which is produced cost-effectively and at the same time has a high sensitivity in detecting pressure.

With the foregoing and other objects in view there is provided, in accordance with the invention, a pressure sensor device. The pressure sensor device contains a diaphragm having a first side acted upon by a working medium, a second side, and a central point. A sensor chip is disposed on the second side of the diaphragm remote from the working medium. The sensor chip has a measuring bridge with four sensor elements, the sensor elements are formed in two pairs with the sensor elements within the pairs disposed parallel to one another and the pairs are disposed at right angles to one another. The sensor elements are disposed such that the sensor elements are closely spaced apart from one another in an edge region of the sensor chip that faces toward the central point of the diaphragm.

In accordance with an added feature of the invention, the sensor elements are piezoresistive sensor elements.

In accordance with a further feature of the invention, the sensor chip has a further measuring bridge. The sensor chip is disposed on the diaphragm in such a way that both the measuring bridge and the further measuring bridge are acted upon by equivalent mechanical stresses.

Other features which are considered as characteristic for the invention are set forth in the appended claims.

Although the invention is illustrated and described herein as embodied in a pressure sensor device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
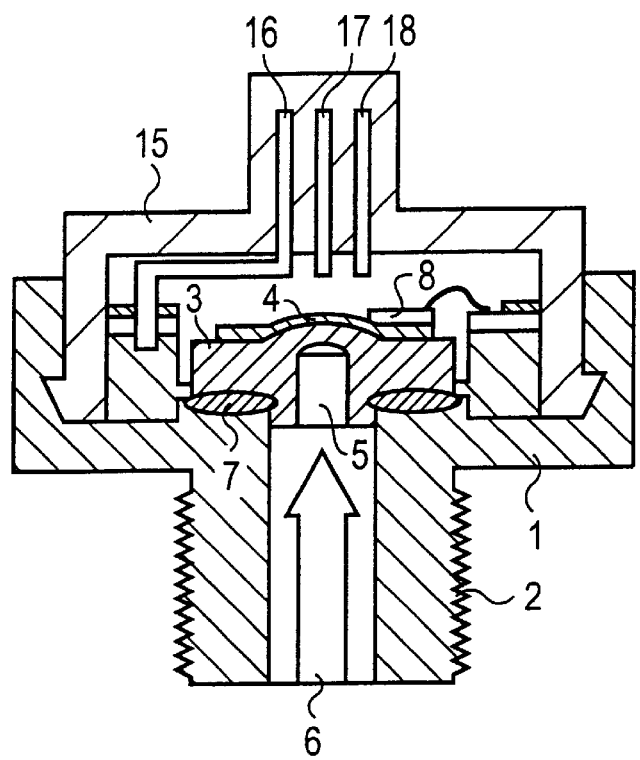
FIG. 1 is a diagrammatic, sectional view of a pressure sensor device according to the invention.

Elements having the same construction and function are identified by the same reference symbols throughout the figures. Referring now to the figures of the drawing in detail and first, particularly, to FIG. 1 thereof, there is shown a pressure sensor device that contains a first housing part 1 with an external thread 2, which can be screwed into a corresponding counterpart thread of, for example, a fuel rail (common rail) of an internal combustion engine.

A diaphragm body 3 is provided, which is connected to the first housing part 1 preferably by a welded connection. The diaphragm body 3 is preferably formed from steel, but may also be formed from ceramic, for example. The diaphragm body 3 contains a diaphragm 4, which is formed in a manner adjoining a cylindrical recess 5 in the diaphragm body 3. The cylindrical recess 5 is referred to as a hole 5 below. The diaphragm 4 is acted upon by a working medium 6 on one side. On that side of the diaphragm that is remote from the working medium 6, a sensor chip 8 is fixed with the aid of a bonding medium. The bonding medium is preferably a glass solder or an adhesive. The sensor chip 8 has sensor elements 10, 11, 12, 13 (FIG. 2) which are interconnected in the form of a Wheatstone bridge and yield a measurement signal which represents the pressure in the working medium 6.

The pressure sensor device furthermore has a second housing part 15 (FIG. 1), in which plug contacts 16, 17, 18 are disposed which are electrically conductively connected to connections on the sensor chip 8.

Figure 2:
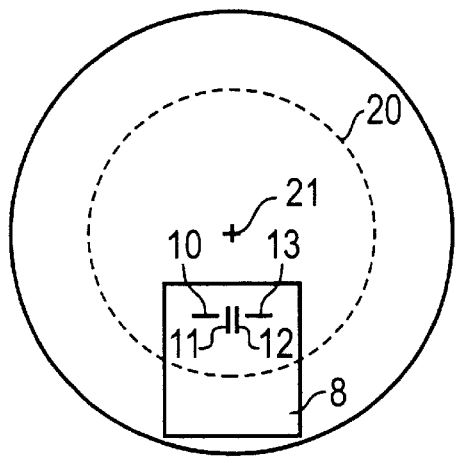
FIGS. 2 to 7 are plan views of a diaphragm body disposed in the pressure sensor device.

FIG. 2 shows a plan view of the diaphragm body 3, to be precise of the side on which the sensor chip 8 is disposed. A circle 20 depicted by dashes represents a projection of the hole 5. A central point of the hole is identified by the reference symbol 21.

The sensor elements 10 to 13 are preferably formed in a monolithically integrated manner on the sensor chip 8. The sensor elements 10 to 13 are disposed so closely spaced apart from one another on the sensor chip 8 that the mechanical stresses that act on the sensor elements 10 to 13 are approximately identical. The sensor elements 10 to 13 are furthermore disposed in an edge region of the sensor chip 8 that faces toward the central point of the diaphragm 4 that corresponds to the central point 21 of the hole 5. In this part of the edge region, the measurement signal supplied by the sensor elements 10 to 13 has a particularly high sensitivity, thereby ensuring a high resolution in the desired pressure measuring range.

There are also formed in the sensor chip 8 analog and/or digital circuit structures which serve for the signal conditioning of the measurement signal supplied by the sensor"

elements. The dimensioning of the sensor chip 8 depends on the peripheral size of the circuit structures that are to be integrated on the sensor chip 8, but is independent of the diameter of the projection 20 of the hole 5. This has the decisive advantage that the sensor chip 8 can be used for the diaphragm body 3 having different diameters of the projection 20 of the hole 5. At the same time, disposing the sensor element 10–13 in the edge region that faces toward the central point of the diaphragm ensures that mechanical stresses that bring about a deformation of the diaphragm 4 can be detected with a very high resolution. The edge region is approximately the outer third of the area of the sensor chip 8.

The sensor chip 8 is disposed asymmetrically with respect to the central point of the diaphragm 4, to be precise in such a way that a large part of the sensor chip 8 bears on the diaphragm body 3 outside the projection 20 of the hole 5. This has the advantage that the circuit structures situated in this region are acted upon by significantly smaller mechanical stresses than is the case within the projection 20 of the hole. In this region, it is then possible to dispose corresponding circuit structures which are easily destroyed by mechanical stresses or whose functioning is impaired by mechanical stresses.

The sensor chip 8 is furthermore disposed on the diaphragm body 3 in such a way that the sensor elements 10 to 13 are disposed within the projection 20 of the hole 5 on the diaphragm 4 but near an outer periphery of the hole. In this region, a relatively high positioning tolerance of the sensor chip 8 on the diaphragm body 3 leads only to a very small variation of the measurement signals supplied by the sensor elements.

The sensor element 10 to 13 are not shown to scale in FIG. 2, rather they are preferably formed as piezoresistive sensor elements 10 to 13 having a length of about 50 micrometers and a width of about 5 micrometers, while the sensor chip has dimensions of 3 by 4 millimeters.

Figure 3:
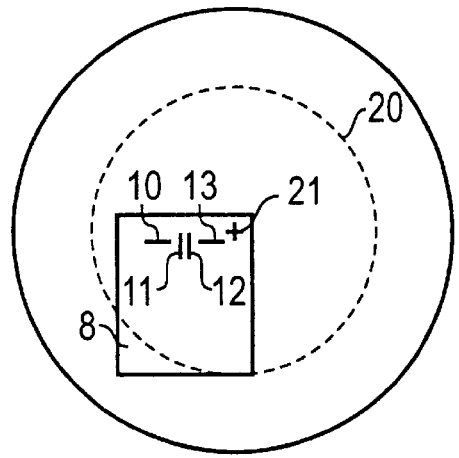
Figure 4:
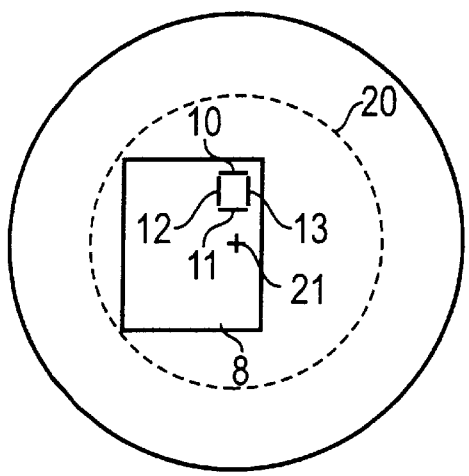
Figure 5:
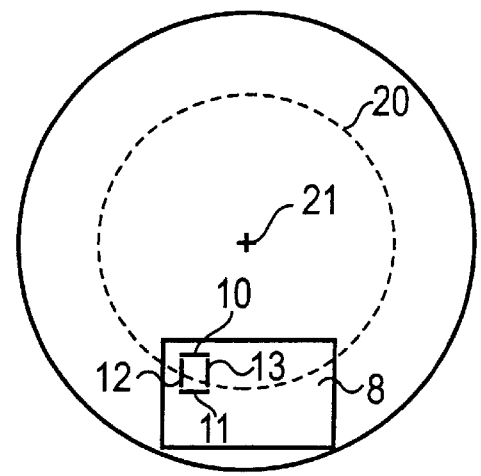

FIGS. 3, 4, 5 show alternative configurations of the sensor chip 8 on the diaphragm body 3 and correspondingly alternative configurations of the sensor elements 10 to 13 on the sensor chip 8. In all cases, the sensor elements 10 to 13 are disposed in two pairs disposed parallel, the pairs in each case being disposed at right angles to one another.

Figure 6:
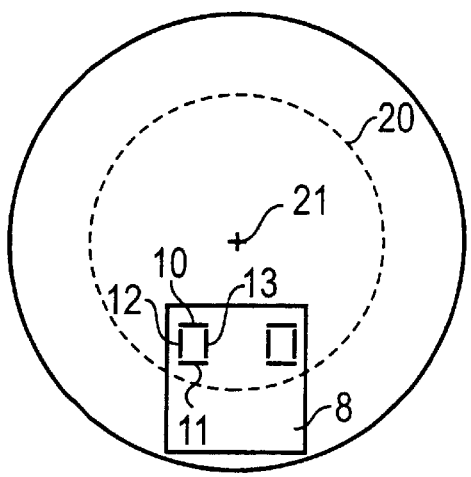

FIG. 6 shows an embodiment in which a further measuring bridge with corresponding sensor elements is formed on the sensor chip 8. In this case, the sensor chip 8 is disposed on the sensor diaphragm 4 in such a way that both measuring bridges are acted upon by approximately identical mechanical stresses. This is the case if the two measuring bridges are in each case at approximately the same radial distance from the central point of the diaphragm.

In this embodiment, it is advantageously possible to identify a detachment of the sensor chip 8 in the region of one of the measuring bridges and, if appropriate, to generate a corresponding error message.

Figure 7:
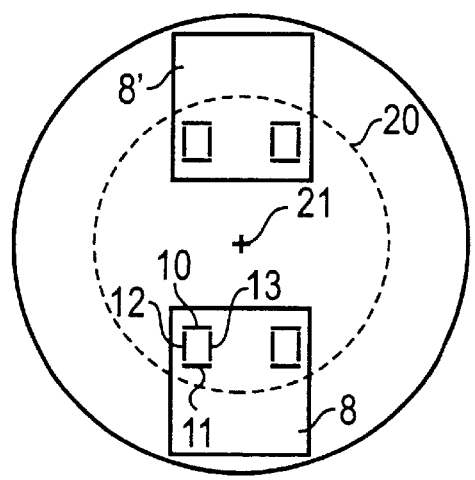

FIG. 7 discloses the configuration of two sensor chips 8 and 8' on the diaphragm body 3. As a result, especially for use as brake pressure sensor, the redundancy that is required for safety reasons can be ensured in a simple manner.

Forming the sensor elements 10 to 13 as piezoresistive sensor elements has the advantage that the sensor elements can be formed simply on the sensor chip 8 in the form of an ASIC. Furthermore, the sensor elements 10 to 13 formed as piezoresistive sensor elements have a very high sensitivity. However, the sensor elements can also be formed for example as thin film strain gauges.

We claim:

1. A pressure sensor device, comprising:

a diaphragm having a first side acted upon by a working medium, a second side, and a central point; and a sensor chip disposed on said second side of said diaphragm remote from the working medium, said sensor chip having a measuring bridge with four sensor elements, said sensor elements formed in two pairs with said sensor elements within said pairs disposed parallel to one another and said pairs disposed at right angles to one another, said sensor elements disposed such that said sensor elements are closely spaced apart from one another in an edge region of said sensor chip which faces toward said central point of said diaphragm.

2. The pressure sensor device according to claim 1, wherein said sensor elements are piezoresistive sensor elements.

3. The pressure sensor device according to claim 1, wherein said sensor chip has a further measuring bridge, and said sensor chip is disposed on said diaphragm in such a way that both said measuring bridge and said further measuring bridge are acted upon by equivalent mechanical stresses.

* * * * *